United States Patent Office 2,958,576
Patented Nov. 1, 1960

2,958,576

PREPARATION OF A METAL FLUORIDE

Franciszek Olstowski, Freeport, Tex., assignor to The Dow Chemical Company, Midland, Mich., a corporation of Delaware No Drawing. Filed Apr. 7, 1958, Ser. No. 726,636

6 Claims. (Cl. 23—88)

This invention relates to the preparation of a metal fluoride, and more particularly, to a process for the preparation of a metal fluoride by the reaction of a metal carbonate with a fluorocarbon.

In recent years the demand for metal fluorides has increased considerably. Industry with the present methods of manufacturing these fluorides has been slow in meeting this growing demand. The majority of the processes used for the preparation of metal fluorides employs hydrogen fluoride as a raw material and because of this there is required expensive specialized equipment for their manufacture. Since these processes depend upon hydrogen fluoride production, the preparation of a fluoride salt is expensive and the ability of the industry to expand rapidly to meet the demand for fluoride salts is greatly limited.

It is, therefore, an object of this invention to provide a process for the preparation of a metal fluoride using readily available reactants other than hydrogen fluoride.

The above and other objects are attained, according to the invention, by contacting a metal carbonate, such as lithium carbonate, sodium carbonate, potassium carbonate, barium carbonate, and calcium carbonate, with a fluorocarbon at a temperature above 500° C. Upon contacting the carbonate with a fluorocarbon at a suitable temperature, the fluorocarbon reacts with the carbonate forming the metal fluoride which may be easily separated from the reaction mixture. In the process, specialized equipment is not required since the reactants are not as hazardous and reactive as hydrogen fluoride. Thus, plant costs are considerably reduced and the metal fluorides may be inexpensively prepared. Since this method is not dependent upon hydrogen fluoride production and requires relatively inexpensive equipment, the production of these salts may be rapidly increased to meet the growing demand providing a flexibility to the industry, which was not heretofore possible.

The reaction which occurs may be illustrated by the following equations where the reaction of potassium carbonate with carbon tetrafluoride as one example and with hexafluoroethane as another are shown:

$$2K_2CO_3 + CF_4 \rightarrow 4KF + 3CO_2$$
$$6K_2CO_3 + 2C_2F_6 \rightarrow 12KF + 8CO_2 + 2CO$$

Fluorocarbons, such as carbon tetrafluoride, hexafluoroethane, octofluoropropane and others as well as the mixtures of these fluorocarbons may be used. Although stoichiometric amounts of the fluorocarbon to react with the metal carbonate may be used, a slight excess of the fluorocarbon is generally employed. The term "fluorocarbon," as used herein, means compounds of carbon and fluorine only.

In addition to potassium carbonate as shown in the above reactions, carbonates of lithium, sodium, barium and calcium may also be reacted to obtain the respective metal fluoride.

The reaction may be carried out at atmospheric pressure and at a temperature generally above 500° C. While the reaction is operative below 500° C., the rate of reaction is slow and thus impractical. The optimum reaction temperature used will depend upon the particular carbonate reacted, but for most of the carbonates a temperature in the range of 600° C. to 900° C. is employed. No particular advantage is obtained by using a temperature much above 900° C. Generally it is preferred to operate below the melting point of the carbonate or the resulting fluoride salt obtained to keep the reaction product from adhering to the equipment and to prevent poor reaction kinetics occurring with fused materials.

The actual reaction of the carbonate with the fluorocarbon is relatively rapid and can be substantially completed in about 10 minutes. However, since the reaction is most often carried out with the carbonate in a solid state, the actual contact time employed may be much longer depending upon the efficiency obtained in contacting the solid with the fluorocarbon. The method used in contacting a solid with a gas and the particle size of the solid determine the rate in which the reaction will proceed. Thus, even though the particle size and the equipment used in the reaction are not critical, these factors will determine the optimum contact time required to substantially complete the reaction between the carbonate and the fluorocarbon. With a fine particle size, e.g. particles passing through 200 mesh standard screen, and equipment giving good contact, a contact time of 10 minutes or so may be sufficient, while in a laboratory where the reaction is carried out by passing a gas over the surface of the solid in a container as long as 4 hours may be required. When conventional equipment ordinarily used in solid-gas reactions is employed, a granular form of the carbonate may generally be used, unless a fluid bed technique is used when finer particles would be necessary.

The following examples further illustrate the process of the invention but are not to be construed as limiting it thereto.

*Example I*

Approximately 4 grams of sodium carbonate were placed in a graphite boat and the boat set in nickel tubular reactor having a diameter of approximately 1 inch. The tubular reactor containing the carbonate was heated in a furnace to a temperature of 800° C. and, while the sodium carbonate was maintained at this temperature, a mixture of fluorocarbon gases containing 36.2 volume percent of carbon tetrafluoride, 47.1 volume percent of hexafluoroethane, and the remainder carbon dioxide was passed through the reactor over the surface of the heated sodium carbonate at a rate of 0.25 standard cubic foot per hour for four hours. At the end of this time, the tube was cooled, the graphite boat removed and the reaction product analyzed by wet analysis for fluoride ion content. It was thus determined that the product contained 96 weight percent of sodium fluoride.

In a manner described above the run was repeated wherein the sodium carbonate was heated to 600° C. and the mixture of the fluorocarbon gases passed over the surface of the carbonate for 4 hours. Upon analysis of the reaction product obtained it was found to contain 85.6 weight percent of sodium fluoride.

*Example II*

In a manner similar to that described in Example I potassium carbonate was reacted with fluorocarbon gases. Approximately 8 grams of potassium carbonate were placed in a graphite boat and inserted in the nickel tubular reactor. The potassium carbonate in the graphite boat was heated to 800° C. and a fluorocarbon gas having approximately the same composition as that used in Example I was passed through the tube and over the surface of the potassium carbonate at a rate of 0.25 standard cubic foot per hour for 4 hours. At the end of this time the tube was cooled and the graphite boat removed. The reaction product in the graphite boat was analyzed in a manner described in Example I which indicated that it contained 94.6 weight percent of potassium fluoride.

A run similar to that above was made wherein the potassium carbonate was reacted with the same fluorocarbon gas mixture at a temperature of 600° C. The fluorocarbon gas was passed through the reactor also at the same rate. At the end of 4 hours the tube was cooled and the reaction product analyzed. It was found that the reaction product contained 85.6 weight percent of potassium fluoride.

Example III

In a manner similar to that described in Example I, approximately 5 grams of lithium carbonate were placed in a graphite boat and the boat inserted into the 1 inch in diameter nickel tubular reactor. The lithium carbonate in the graphite boat was heated to a temperature of approximately 600° C. and fluorocarbon gas mixture similar to that used in Example I was passed over the surface of the heated lithium carbonate for a length of time of 4 hours at a rate of 0.25 standard cubic foot per hour. At the end of this time, the tube was cooled and the reaction product in the graphite boat was analyzed by a wet method for fluoride ion content. It was thus determined that 65 percent of the reaction product was lithium fluoride.

What is claimed is:

1. A process for the preparation of a metal fluoride, which comprises contacting a carbonate selected from the group consisting of the carbonates of lithium, sodium, potassium, barium, and calcium with a lower aliphatic fluorocarbon at a temperature in the range of 500° to 900° C., and separating the metal fluoride from the resulting reaction product.

2. A process according to claim 1 wherein the fluorocarbon is carbon tetrafluoride.

3. A process according to claim 1 wherein the fluorocarbon is a mixture of carbon tetrafluoride and hexafluoroethane.

4. A process for the preparation of sodium fluoride, which comprises contacting sodium carbonate with a mixture of carbon tetrafluoride and hexafluoroethane at a temperature in the range of 600° to 900° C., and separating the sodium fluoride from the resulting reaction mixture.

5. A process for the preparation of potassium fluoride, which comprises contacting potassium carbonate with a mixture of carbon tetrafluoride and hexafluoroethane at a temperature in the range of 600° to 900° C., and separating the potassium fluoride from the resulting reaction mixture.

6. A process for the preparation of lithium fluoride, which comprises contacting lithium carbonate with a mixture of carbon tetrafluoride and hexafluoroethane at a temperature in the range of 600° to 900° C., and separating the lithium fluoride from the resulting reaction mixture.

References Cited in the file of this patent

UNITED STATES PATENTS 2,674,518   Evers et al. _____ Apr. 6, 1954

OTHER REFERENCES

Mellor: Comprehensive Treatise on Inorganic and Theoretical Chemistry, vol. 2 (1922), p. 767, published by Longmans, Green and Co., New York, N.Y.